(12) United States Patent
Sun

(10) Patent No.: US 11,836,489 B2
(45) Date of Patent: *Dec. 5, 2023

(54) SPARSE MATRIX CALCULATIONS UTILIZING TIGHTLY COUPLED MEMORY AND GATHER/SCATTER ENGINE

(71) Applicant: Alibaba Group Holding Limited, Grand Cayman (KY)

(72) Inventor: Fei Sun, San Jose, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,466

(22) Filed: Oct. 25, 2022

(65) Prior Publication Data
US 2023/0061425 A1 Mar. 2, 2023

Related U.S. Application Data

(63) Continuation of application No. 16/928,992, filed on Jul. 14, 2020, now Pat. No. 11,481,214.

(51) Int. Cl.
*G06F 17/16* (2006.01)
*G06F 12/02* (2006.01)
*G06F 9/30* (2018.01)
*G06F 9/38* (2018.01)

(52) U.S. Cl.
CPC ........ *G06F 9/3001* (2013.01); *G06F 9/30043* (2013.01); *G06F 9/3887* (2013.01); *G06F 9/3889* (2013.01)

(58) Field of Classification Search
None
See application file for complete search history.

(56) References Cited

U.S. PATENT DOCUMENTS

| 8,578,097 | B2 | 11/2013 | Kim et al. |
| 11,295,199 | B2 * | 4/2022 | Dalli ......................... G06N 3/10 |
| 11,601,651 | B2 * | 3/2023 | Chen .................... H04N 19/132 |
| 2003/0018597 | A1 | 1/2003 | Shetty |

(Continued)

OTHER PUBLICATIONS

AFPGA IP Completes Wireless-Backhaul Method, CM/SIGDA E-Newsletter, Sep. 1, 2008, vol. 38, No. 17, pp. 4-6.

(Continued)

*Primary Examiner* — Hyun Nam

(57) ABSTRACT

A processor for sparse matrix calculation includes an on-chip memory, a cache, a gather/scatter engine, and a core. The on-chip memory stores a first matrix or vector, and the cache stores a compressed sparse second matrix data structure. The compressed sparse second matrix data structure includes a value array including non-zero element values of the sparse second matrix, where each entry includes a given number of element values; and a column index array where each entry includes the given number of offsets matching the value array. The gather/scatter engine gathers element values of the first matrix or vector using the column index array of the sparse second matrix. In a hybrid horizontal/vertical implementation, the gather/scatter engine gathers sets of element values from sets of rows and from different sub-banks within the same rows based on the column index array of the sparse matrix.

20 Claims, 12 Drawing Sheets

(56) References Cited

U.S. PATENT DOCUMENTS

| | | |
|---|---|---|
| 2007/0198621 A1 | 8/2007 | Lumsdaine et al. |
| 2011/0307685 A1* | 12/2011 | Song .................. G06F 17/10 |
| | | 712/16 |
| 2012/0144130 A1* | 6/2012 | Fossum .................. G06F 17/16 |
| | | 711/E12.001 |
| 2014/0189231 A1* | 7/2014 | Maydan .............. G06F 9/30047 |
| | | 711/110 |
| 2014/0279727 A1 | 9/2014 | Baraniuk et al. |
| 2015/0106596 A1* | 4/2015 | Vorbach ................ G06F 9/3877 |
| | | 712/221 |
| 2016/0124649 A1* | 5/2016 | Liu .................. G06F 3/061 |
| | | 711/103 |
| 2016/0140084 A1* | 5/2016 | Daga .................. G06F 17/16 |
| | | 708/207 |
| 2016/0309105 A1 | 10/2016 | Dierickx et al. |
| 2016/0358075 A1 | 12/2016 | Zhang et al. |
| 2016/0378442 A1 | 12/2016 | Rong et al. |
| 2017/0316312 A1* | 11/2017 | Goyal .................. G06F 17/16 |
| 2017/0357889 A1 | 12/2017 | Zhang et al. |
| 2018/0046895 A1 | 2/2018 | Xie et al. |
| 2018/0157969 A1 | 6/2018 | Xie et al. |
| 2018/0173437 A1* | 6/2018 | Mishra ................ G06F 9/30036 |
| 2018/0174028 A1 | 6/2018 | Lin et al. |
| 2018/0275909 A1* | 9/2018 | Agrawal ................ G06F 12/00 |
| 2018/0309451 A1 | 10/2018 | Lu et al. |
| 2018/0345650 A1 | 12/2018 | Chisena et al. |
| 2018/0349764 A1 | 12/2018 | Zhang et al. |
| 2019/0065150 A1 | 2/2019 | Heddes et al. |
| 2019/0095787 A1 | 3/2019 | Kung et al. |
| 2019/0108436 A1* | 4/2019 | David .................. G06N 3/086 |
| 2019/0146497 A1 | 5/2019 | Urtasun et al. |
| 2019/0156206 A1 | 5/2019 | Graham et al. |
| 2019/0158097 A1 | 5/2019 | Lu et al. |
| 2019/0278600 A1 | 9/2019 | Frumkin et al. |
| 2019/0347536 A1 | 11/2019 | David et al. |
| 2019/0362809 A1 | 11/2019 | Okimoto et al. |
| 2020/0051203 A1 | 2/2020 | Nurvitadhi et al. |
| 2020/0082254 A1 | 3/2020 | Dally et al. |
| 2020/0151571 A1 | 5/2020 | Wu |
| 2021/0097130 A1* | 4/2021 | Liu .................. H03M 7/3066 |
| 2021/0191724 A1* | 6/2021 | Pal .................. G06F 9/3802 |
| 2022/0019430 A1* | 1/2022 | Sun .................. G06F 9/30036 |
| 2022/0399946 A1* | 12/2022 | Marshall .............. H04W 24/06 |
| 2023/0061425 A1* | 3/2023 | Sun .................. G06F 9/30043 |
| 2023/0153381 A1* | 5/2023 | Wang .................. G06N 3/048 |
| | | 382/159 |

OTHER PUBLICATIONS

Pittman, Richard et al., eMIPS, A Dynamically Extensible Processor, Technical Report MSR-TR-2006-0143, Oct. 2006, pp. 1-28.

Getman, Larry, Creating the Xilinx ZYNQ-7000 Extensible Processing Platform, EE Times, Oct. 17, 2011, pp. 1-3.

Xtensa LX7 Processor, High-Performance, Configurable and Extensible Controllers and DSPs, Cadence, Tensilica Datasheet, 2016, pp. 1-13.

Moyer, Bryon, How Does Scatter/Gather Work? Promises of Single-Cycle Access Are True, But . . . , EE Journal, Feb. 9, 2017, pp. 1-7.

He, Bingsheng et al., Efficient Gather Scatter Operations on Graphics Processors, SC07 Nov. 10-16, 2007, pp. 1-12.

Lukarski, Dimitar, Sparse Matrix-Vector Multiplication and Matrix Formats, Uppsala Universitet, Apr. 11, 2013, pp. 1-57.

He, Guixia et al., A Novel CSR-Based Sparse Matrix-Vector Multiplication on GPUs, Hindawi Publishing Corporation, vol. 2016, Mar. 27, 2016, pp. 1-13.

Matt Eding, "Sparse Matrices", Apr. 25, 2019, Python & Data Science Blog (Year: 2019).

* cited by examiner $$B = \begin{pmatrix} a_{0,0} & \cdots & a_{0,c-1} \\ a_{1,0} & \cdots & a_{1,c-1} \\ a_{2,0} & \cdots & a_{2,c-1} \\ \vdots & \ddots & \vdots \\ a_{r-1,0} & \cdots & a_{r-1,c-1} \end{pmatrix} \cdot \begin{bmatrix} x_0 \\ x_1 \\ x_2 \\ \vdots \\ x_{r-1} \end{bmatrix} = \begin{bmatrix} x_0 a_{0,0} + x_1 a_{1,0} + x_2 a_{2,0} + \cdots + x_{r-1} a_{r-1,0} \\ \\ x_0 a_{0,c-1} + x_1 a_{1,c-1} + x_2 a_{2,c-1} + \cdots + x_{r-1} a_{r-1,c-1} \end{bmatrix}$$

FIG. 1
PRIOR ART

$$B = \begin{pmatrix} 0 & 4 & 2 \\ 4 & 3 & 0 \end{pmatrix} \cdot \begin{pmatrix} 0 & 1 \\ 1 & 2 \\ 2 & 3 \end{pmatrix} = \begin{pmatrix} 0+4+4 & 0+8+6 \\ 0+3+0 & 4+6+0 \end{pmatrix} = \begin{pmatrix} 8 & 14 \\ 3 & 10 \end{pmatrix}$$

FIG. 2
PRIOR ART

$$\begin{pmatrix} 0 & 4 & 1 & 0 & 9 & 2 & 0 & 0 \\ 6 & 3 & 0 & 0 & 3 & 0 & 0 & 0 \\ 0 & 0 & 0 & 0 & 0 & 2 & 0 & 0 \\ 4 & 3 & 0 & 0 & 1 & 0 & 4 & 0 \\ 0 & 4 & 2 & 0 & 4 & 0 & 0 & 0 \\ 4 & 3 & 0 & 0 & 0 & 0 & 5 & 0 \\ 0 & 7 & 0 & 0 & 0 & 0 & 0 & 4 \end{pmatrix}$$

FIG. 3
PRIOR ART

Value Array

| 4 | 1 | 9 | 2 | 6 | 3 | 3 | 2 | 4 | 3 | 1 | 4 | 4 | 2 | 4 | 4 | 3 | 5 | 7 | 4 |

Column Indices Array

| 1 | 2 | 4 | 5 | 0 | 1 | 4 | 5 | 0 | 1 | 4 | 6 | 1 | 2 | 4 | 0 | 1 | 6 | 1 | 7 |

Row Pointer Array

| 0 | 4 | 7 | 8 | 12 | 15 | 18 | 20 |

FIG. 4
PRIOR ART

710
Prune a dense matrix, so that a number of non-zero values in each row is a multiple of a number of sub-banks of an on-chip memory, and a number of entries falling in each sub-bank of the on-chip memory is the same, to generate a sparse matrix

720
Generate a compressed sparse matrix having a data structure including 1) a value array including the non-zero element values of the sparse matrix, where each entry include x element values, where x is a number of banks of an on-chip memory, 2) a column index array, where each entry includes x offsets matching the value array, 3) an optional base index array including the base address of the element value, and 4) an index pointer array including the index of the first element of each row.

730
Store the compressed sparse matrix

FIG. 7

810
Gather element values of a first matrix from the on-chip memory using a column index array and optionally a base index array of a compressed sparse second matrix from cache, wherein the data structure of the compressed sparse second matrix includes 1) a value array including the non-zero element values of the sparse second matrix, where each entry includes x element values, 2) a column index array, where each entry includes x offsets matching the value array, 3) an optional base index array including the base address of the element value, and 4) an index pointer array including the index of the first element of each row, and wherein the column index array is configured for gathering sets of elements values from A) different sub-banks within a same row, B) from different rows, or C) from a set of rows and from different sub-banks within the same rows.

820
Perform a sparse matrix-matrix multiplication or sparse matrix-vector multiplication using the gathered element values of the first matrix and the value array of the second matrix.

830
Store the result of the sparse matrix-matrix multiplication or sparse matrix-vector multiplication

FIG. 8

SPARSE MATRIX CALCULATIONS UTILIZING TIGHTLY COUPLED MEMORY AND GATHER/SCATTER ENGINE

RELATED APPLICATION

The present application is a continuation of U.S. patent application Ser. No. 16/928,992 filed on Jul. 14, 2020.

BACKGROUND OF THE INVENTION

Vector and matrix multiplications are common computations performed by computing devices. Vector and matrix multiplication operations are commonly used in machine learning, artificial intelligence, neural networks, data analytics and the like. For example, a number of applications compute vector and or matrix multiplication between an input or activation matrix and a weight vector or matrix. The computations can be performed hundreds, thousand or even more times.

Referring to FIG. 1, matrix-vector multiplication between a c×r matrix A and a column vector X of r rows comprises the dot product of X with each of the rows of A. The dot product can be computed by multiplying each element in the first row of matrix A with the corresponding element in the column of vector X and summing the partial products thereof, and repeating the process for each row matrix A. Matrix-matrix multiplication can be considered as a plurality of matrix-vector multiplications. An exemplary matrix-matrix multiplication between a c×r matrix A and a r×c matrix X is illustrated in FIG. 2. It is also noted that matrix-matrix multiplication and matrix-vector multiplication are equivalent when one of the matrices is a single-row matrix (e.g., row vector) or single-column matrix (e.g., column vector).

Referring now to FIG. 3, an exemplary sparse matrix is illustrated. A sparse matrix is a matrix in which the majority of the element values are zero. In contrast, a matrix in which the majority of element values are non-zero is referred to as a dense matrix. A matrix can conventionally be stored as a two-dimensional array. Each entry in the array represent an element $a_{i,j}$ of the matrix and is accessed by the two indices i and j. For a m×n matrix, the amount of memory required to store the matrix is proportional to m×n. For sparse matrix, the amount of memory for storage can be reduced by only storing the non-zero element values. There are a number of data structures used for storing sparse matrices in a condensed format, including but not limited to, dictionary of keys, list of lists, coordinate list, compressed sparse row, compressed sparse column, and the like.

Referring now to FIG. 4, an exemplary compressed sparse row (CSR) data structure according to the conventional art is shown. The CSR data structure represent a sparse matrix with three arrays: a row pointer array, a column indices array and a value array. The value array includes the non-zero values. The column indices array indicates the column in which the non-zero values are located in a given row. The row pointer array indicates where non-zero values for the corresponding row start in the value array. Similarly, a compressed sparse column (CSC) data structure can represent a sparse matrix with a column pointer array, a row indices array and value array. Generally, compressed format matrix data structures, such as CSR and CSC, reduce the amount of storage consumed by the matrix. The compressed format matrix data structures, such as CSR or CSC, can also reduce the computational workload by eliminating computations involving zero value matrix elements.

In some implementations, it is advantageous to prune a dense matrix to generate a sparse model. In an irregular sparse pruning model, matrix values that are determined to have a small effect on the results of a given application are replaced with zero values and matrix values that have a larger effect are kept regardless of their locations in the matrix. The irregular sparse pruning model can produce relatively better accuracy. However, sparse matrices generated with the irregular pruning model can be inefficient when used for computing on single instruction multiple (SIMD) enabled processing units. In a structured sparse pruning model, matrix values in predetermined locations are replaced with zero values. The structured sparse model can produce relatively worse accuracy. However, sparse matrices generated with the structured pruning model can be more efficient when used in computing on SIMD enabled processing units.

Accordingly, there is a continuing need for improved compressed format data structures and matrix pruning models for use with sparse matrix-vector multiplication (spMV) and sparse matrix-matrix multiplication (spMM).

SUMMARY OF THE INVENTION

The present technology may best be understood by referring to the following description and accompanying drawings that are used to illustrate embodiments of the present technology directed toward sparse matrix calculation. Although embodiments of the present technology are explained herein with reference to compressed sparse row (CSR) data structures, they can also be readily adapted to compressed sparse column (CSC) data structures.

In one embodiment, a computing device implemented matrix processing method can include gathering element values of a first matrix, from an on-chip memory, using a column index array of a compressed sparse second matrix, from a cache, where the column index array is configured for gathering sets of element values from different sub-banks of a bank of a plurality of banks of the on-chip memory within a same row. The compressed sparse second matrix is generated from a sparse second matrix. The sparse second matrix is generated by pruning a dense second matrix, so that at least a number of non-zero values in each row of the dense second matrix is a multiple of a given number of sub-banks of a bank of the plurality of banks of the on-chip memory. The element values can also be gathered from different sub-banks within a same row, from different rows, or from a set of rows. A sparse matrix-matrix multiplication or sparse-matrix-vector multiplication can be computed using the gathered elements of the first matrix and a value array of the compressed sparse second matrix.

In another embodiment, a processor can include an on-chip memory, a core and a cache. The on-chip memory can include a plurality of banks, wherein each bank includes a plurality of sub-banks. The on-chip memory can be configured to store a first matrix where each on-chip memory, of the one or more on-chip memories, includes a plurality of banks, and wherein each bank of the plurality of banks includes a plurality of sub-banks, and the cache can be configured to store a compressed sparse second matrix. The processor can include a gather/scatter engine configured to gather element values of the first matrix using the column index array of the compressed sparse second matrix. In a horizontal implementation, the gather/scatter engine can be configured to gather sets of element values from different sub-banks within a same row for a given offset of the column index array. In a vertical implementation, the gather/scatter engine can be configured to gather sets of element values from different rows for a given offset of the column index array. In a hybrid horizontal/vertical implementation, the gather/scatter engine can be configured to gather sets of element values from a set of rows and from different sub-banks within the same rows. The core can be configured to perform sparse matrix-matrix multiplication or sparse-matrix-vector multiplication using the gathered elements of the first matrix and the value array of the compressed sparse second matrix.

The core, another core, another processor or another computing system can also be configured to prune a dense matrix. The core can be further configured to compress the sparse second matrix having a data structure including a value array, a column index array, optionally a based index array, and an index pointer array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which:

FIG. 1 illustrates matrix-vector multiplication according to the conventional art.

FIG. 2 shows an exemplary matrix-matrix multiplication according to the conventional art.

FIG. 3 shows an exemplary sparse matrix according to the conventional art.

FIG. 4 shows an exemplary compressed sparse row (CSR) data structure according to the conventional art.

FIG. 7 shows a process of storing a matrix in memory, in accordance with aspects of the present technology.

FIG. 8 shows a process of computing a sparse matrix-vector multiplication or sparse matrix-matrix multiplication, in accordance with aspects of the present technology.

DETAILED DESCRIPTION OF THE INVENTION

Figure 5:
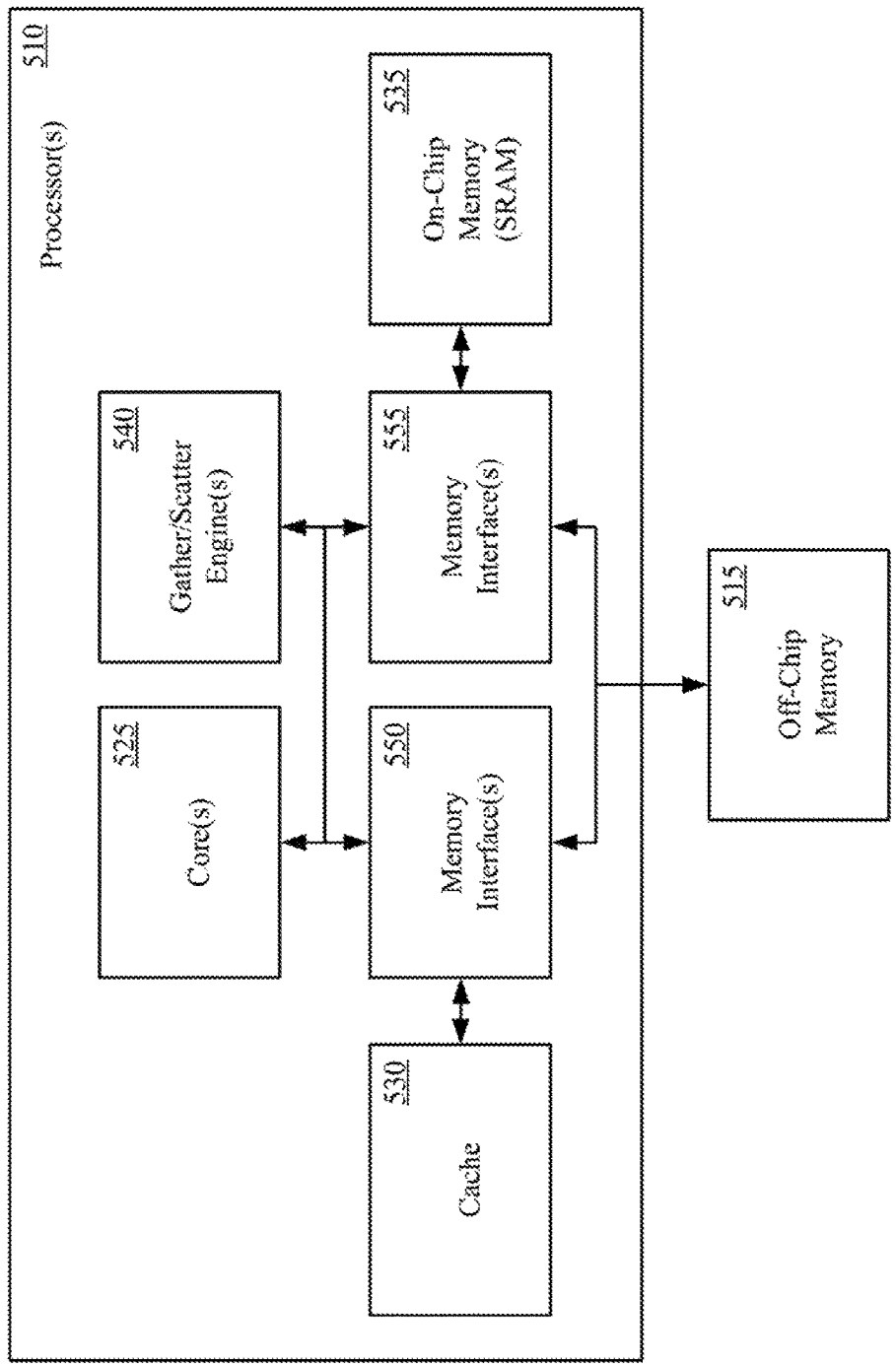
FIG. 5 shows an exemplary computing system for implementing aspects of the present technology.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Referring now to FIG. 5, an exemplary computing system for implementing aspects of the present technology is shown. The exemplary computing system 500 can be configured to perform sparse matrix pruning processes in accordance with aspects of the present technology. The exemplary computing system 500 can also be configured to perform compressed matrix data formatting processes in accordance with aspects of the present technology. The exemplary computing system 500 can also be configured to perform sparse matrix-vector multiplication (spMV) in accordance with aspects of the present technology. The exemplary computing system 500 can also be configured to perform sparse matrix-matrix multiplication (spMM) in accordance with aspects of the present technology. The exemplary computing device can also perform various combinations of the functions described herein. In other implementations, different computing devices can perform different functions or combinations of the functions described herein.

The exemplary computing system 500 can include one or more processors 510 and one or more off-chip memories 515 coupled together. The exemplary computing system 500 can also include numerous other components that are not necessary to an understanding of aspects of the present technology, and therefore are not described herein. The one or more processors 510 can include one or more cores 525, one or more caches 530, one or more on-chip memories 535, and one or more gather/scatter engines 540 communicatively coupled together. The one or more processors 510 can also include one or more memory interfaces 550, 555 for coupling the one or more caches 530, one or more on-chip memories 535, and one or more off-chip memories 515 to the one or more cores 525 and the one or more gather/scatter engines 540. In one implementation, the one or more cores 525 can be single instruction multiple data (SIMD) enabled cores. In another implementation, the one or more cores 525 can be multiple instruction multiple data (MIMD) enabled cores. In one implementation, the one or more caches 530 and the one or more on-chip memories 535 have their own respect memory interfaces 505, 555. The one or more processors 510 can also include numerous other sub-circuits that are not necessary to an understanding of aspects of the present technology, and therefore are not described herein. The on-chip memory 550 is fabricated on the same chip as the rest of the sub-circuits of the processor 510 and therefore is considered a tightly coupled memory. In one implementation, the on-chip memory 550 can be static random-access memory (SRAM). In one implementation, the gather/scatter engine 540 can be implemented in hardware of the processor 510. In another implementation, the gather/scatter engine 540 can be implemented in software instructions executing on the one or more cores 525. In yet another implementation, the gather/scatter engine 540 can be implemented by a combination of hardware and software.

Aspects of the on-chip memory 550 and gather/scatter engine 540 will be described further with reference to FIG. 6.

Figure 6:
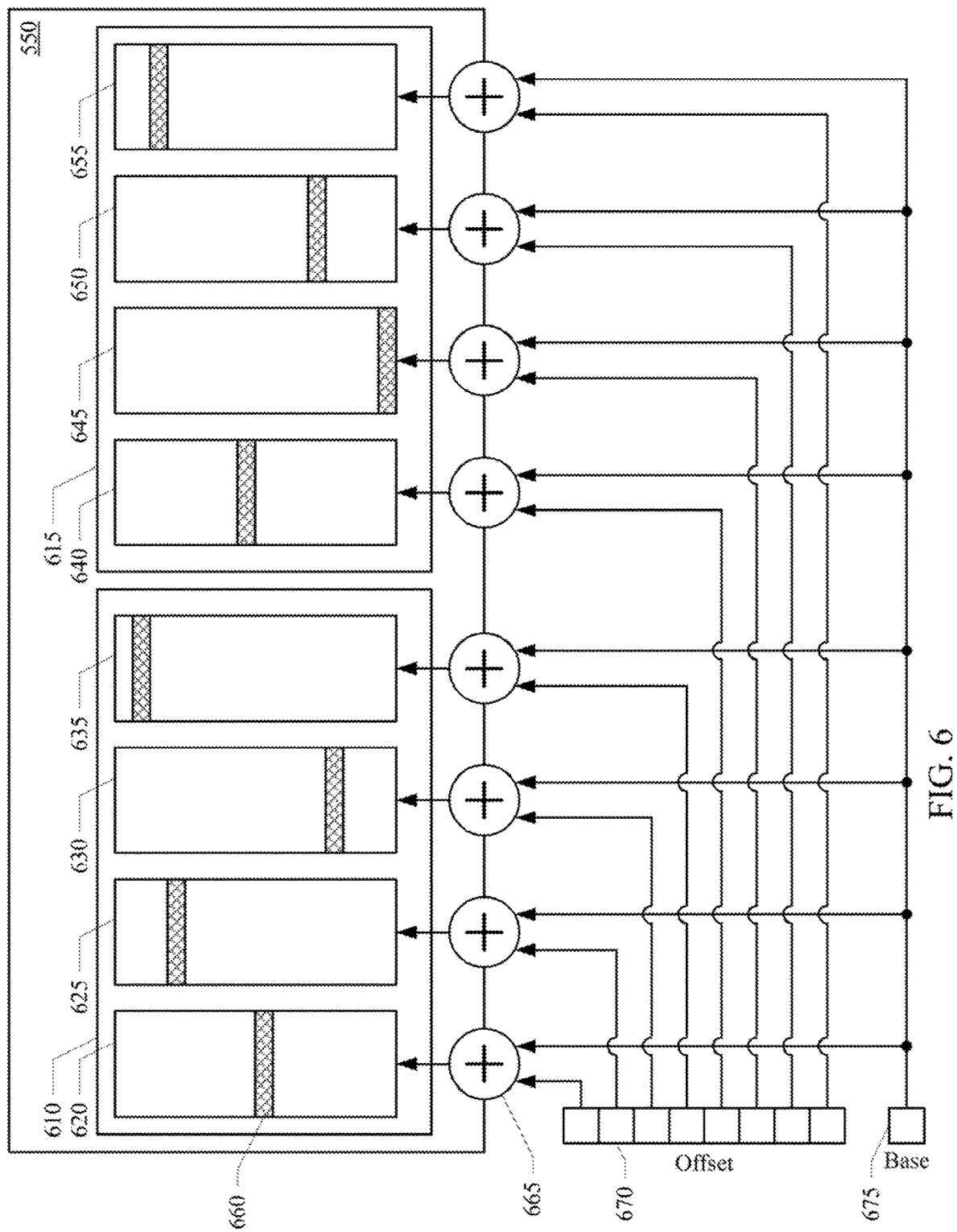
FIG. 6 shows an on-chip memory and access by a gather/scatter engine, in accordance with aspects of the present technology.

As shown in FIG. 6, the on-chip memory 550 can include a plurality of banks 610, 615, and each bank 610, 615 can include a plurality of sub-banks 620-635, 640-655. Each sub-bank can include a plurality of rows 660. The gather/scatter engine 570 can be configured to access a different row 650 within each sub-bank 620-635, by adding 665 an offset 670 for each sub-bank 620-635 to a base address 675. In one implementation, the on-chip memory can include sixteen sub-banks. Accordingly, the gather/scatter engine 570 can utilize a base address and sixteen offsets. If two or more entries fall in the same bank, the load or store can take multiple cycles. The throughput without bank conflict can be one load or store per cycle. It can also be possible to merge multiple load and or store requests.

Referring now to FIG. 7, a process of storing a matrix in memory, in accordance with aspects of the present technology, is shown. The process can include pruning a dense matrix to generate a sparse matrix, at 710. The dense matrix can be pruned so that a number of non-zero values in each row is a multiple of a given number of sub-banks of a given memory. The dense matrix can also be pruned so that a number of entries falling in each sub-bank of the on-chip memory is the same. In one implementation, the given memory can be one or more on-chip memories 525 of one or more processors 510. The one or more on-chip memories 525 of the one or more processors 510 can have the given number of sub-banks. In one implementation, the dense matrix can be a weight matrix and the generated sparse matrix can be a sparse weight matrix.

At 720, a compressed sparse matrix data structure can be generated. The compressed sparse matrix data structure can include four arrays. A value array can include the non-zero element values of the matrix. Each entry in the value array can include x elements, wherein x is the number of sub-banks. A column index array can include the offset of the element values. Each entry in the column index array can include the x offsets matching the value array. The offset can, for example, be a 16-bit value, an 8-bit value or any other bit value. An optional base index array can include the base address of the element value. However, the base index array can be ignored if all the entries in the sparse matrix share the same base index. In such case, when performing sparse matrix-vector multiplication (spMV) or a sparse matrix-matrix multiplication (spMM), the base index can alternatively be derived. An index pointer array can include the index of the first element of each row in the value array. In one implementation, the compressed sparse matrix data structure can be generated by one or more cores 525 of one or more processors 510. In one implementation, the compressed sparse matrix data structure can be a compressed sparse weight matrix data structure.

At 730, the compressed sparse matrix can be stored. In one implementation, the compressed sparse matrix data structure can be stored in the one or more caches 530 of the one or more processors 510, or in off-chip memory 515. For an exemplary compressed sparse weight matrix, the value array can be:

Value[P/X][X]={{0.5,0.7,0.1,0.2},{0.1,0.8,0.3,0.5},
    {0.3,0.1,0.9,0.7}, ... }

The column index array can be:

Offset[P/X][X]={{0,6,9,15},{4,13,14,19},{2,4,11,12},
    {9,18,20,23}, ... }

The offset provides that the X elements in the same entry are from different sub-banks. The base index array can be:

BaseIndex[P/X]={0,0,24,24, ... }

The index pointer array can be:

Indpts[N+1]={0,2,4, ... } where X==4.

Referring now to FIG. 8, a process of computing a sparse matrix-matrix multiplication or sparse matrix-vector multiplication, in accordance with aspects of the present technology, is shown. The process can include gathering element values of a first matrix from one or more on-chip memories using a column index array and optionally a base index array of a compressed sparse second matrix from one or more caches of a processor, at 810. As described above with reference to FIG. 7, the second matrix can have a data structure including a value array, a column index array, an optional base index array and an index pointer array. Each entry in the column index array can include x offsets, wherein x is a number of sub-banks of the on-chip memory. The optional base index array can include the base address of the element value. The index pointer array can include the index of the first element of each row. In one implementation, the element values of the first matrix can be gathered from the one or more on-chip memories 535 by one or more gather/scatter engines 540. In one implementation, the second matrix can be a compressed sparse weight matrix stored in the one or more caches 530 and the first matrix can be an activation matrix stored in the one or more on-chip memories 535 of the processor. In one implementation, the one or more on-chip memories 535 can have a plurality of banks, with each bank including a given number of sub-banks. In the sparse matrix, the number of non-zero values in each row is a multiple of the given number of sub-banks of the one or more on-chip memories 535, and a number of entries falling in each sub-bank of the one or more on-chip memories 535 is the same. In a horizontal implementation, the one or more gather/scatter engines 540 can be configured to gather sets of element values from different sub-banks within a same row based on the column index array of the sparse matrix based on the column index array of the sparse matrix. In a vertical implementation, the one or more gather/scatter engines 540 can be configured to gather sets of element values from different rows based on the column index array of the sparse matrix. In a hybrid horizontal/vertical implementation, the one or more gather/scatter engines 540 can be configured to gather sets of element values from sets of rows and from different sub-banks within the same rows based on the column index array of the sparse matrix.

Referring again to the exemplary compressed sparse weight matrix of:

Value[P/X][X]={{0.5,0.7,0.1,0.2},{0.1,0.8,0.3,0.5}, {0.3,0.1,0.9,0.7}, ... }

Offset[P/X][X]={{0,6,9,15},{4,13,14,19},{2,4,11,12}, {9,18,20,23}, ... }

BaseIndex[P/X]={0,0,24,24, ... }

Indpts[N+1]={0,2,4, ... }

Figure 9:
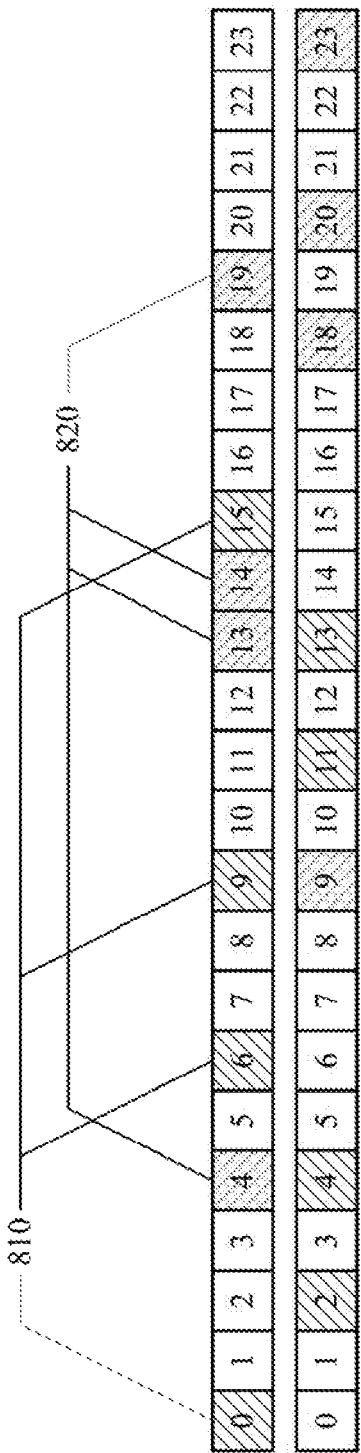
FIG. 9 illustrates an exemplary compressed sparse matrix data structure, in accordance with aspects of the present technology.

In a horizontal format example, the elements of a dense activation matrix stored in an exemplary on-chip memory 535, as illustrated in FIG. 9, can be gathered using the column index array and optionally the base index array of the compressed sparse weight matrix. In the horizontal format, the offset is configured such that the X elements in the same entry are from different sub-banks. For example, the first set of four offset values of the column index array {0, 6, 9, 15} are added to the first base index 0 to determine the locations 910 of values in different sub-banks in the same row in the dense activation matrix. The second set of four offset values of the column index array {4, 13, 14, 19} are added to the second base index 0 to determine the location 920 of the element values in different sub-banks in the same row in the dense activation matrix. The third set of four offset values of the column index array {2, 4, 11, 12} are added to the third base index 24 to determine the locations of values in different sub-banks in the same row in the dense activation matrix.

Figure 10:
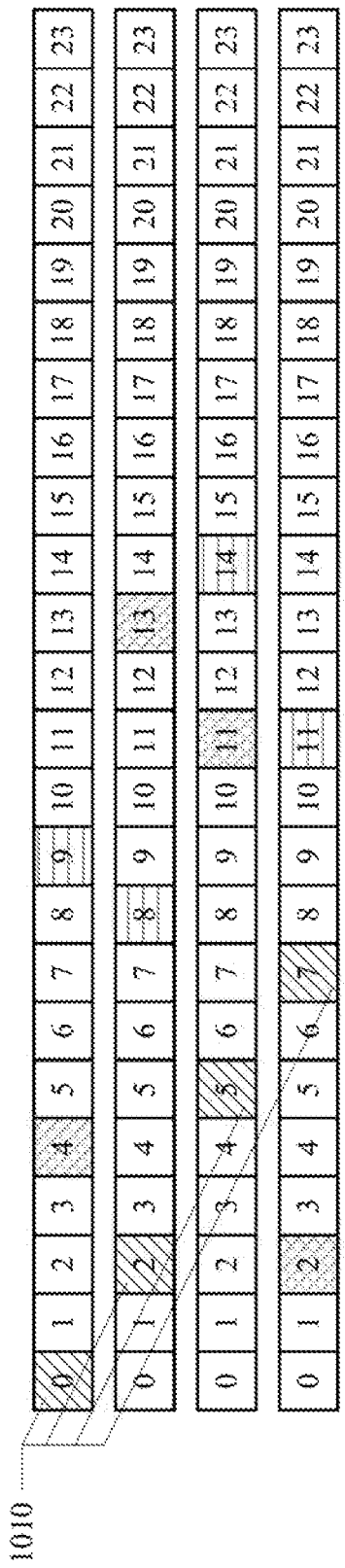
FIG. 10 illustrates an exemplary compressed sparse matrix data structure, in accordance with aspects of the present technology.

In a vertical format example, the elements of a dense activation matrix stored in an exemplary on-chip memory 535, as illustrated in FIG. 10, can be gathered using the column index array and optionally the base index array of the compressed sparse weight matrix. For the exemplary compressed sparse weight matrix of:

Value[P/X][X]={{0.5,0.7,0.1,0.2},{0.1,0.8,0.3,0.5}, {0.3,0.1,0.9,0.7}, ... }

Offset[P/X][X]={{0,2,5,7},{2,3,0,5},{4,10,11,2},{9,8, 14,11}, ... }

BaseIndex[P/X]={0, ... }

BaseIndex[P/X]={0, ... } where X==4,
each entry of the column index array is configured such that the elements values in each entry are from different rows, in the vertical format. For example, the first set of four offset values in the column index array {0, 2, 5, 7} are added to the first base index 0 to determine the locations 1010 of values in different rows in the dense activation matrix. The second set of four offset values of the column index array {2, 3, 0, 5} are added to the second base index 0 to determine the locations of values in different rows in the dense activation matrix.

Figure 11:
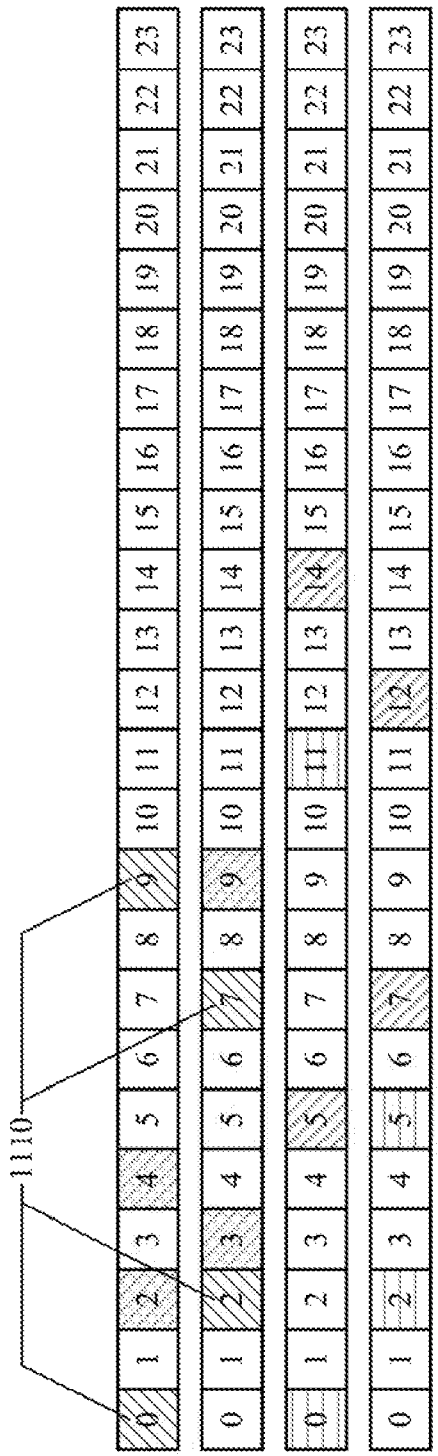
FIG. 11 illustrates an exemplary compressed sparse matrix data structure, in accordance with aspects of the present technology.

In a hybrid horizontal/vertical format example, the elements of a dense activation matrix stored in an exemplary on-chip memory 535, as illustrated in FIG. 11, can be gathered using the column index array and optionally the base index array of the compressed sparse weight matrix. For the exemplary compressed sparse weight matrix of:

Value[P/X][X]={{0.5,0.7,0.1,0.2},{0.1,0.8,0.3,0.5}, {0.3,0.1,0.9,0.7}, ... }

Offset[P/X][X]={{0,9,2,7},{2,4,3,9},{0,11,2,5},{5,14, 7,12}, ... }

BaseIndex[P/X]={0, ... }

BaseIndex[P/X]={0,2,4, ... } where X==4,
each entry of the column index array is configured such that the elements values in each entry are from different sub-banks and from different rows, in the hybrid format. For example, the first set of four offset values in the column index array {0, 9, 2, 7} are added to the first base index 0 to determine the locations 1110 of values in different sub-banks and different rows.

At 820, a sparse matrix-matrix multiplication or sparse matrix-vector multiplication can be performed using the gathered element values of the first matrix and the value array of the second matrix. For example, in the horizontal format, the element values of the dense activation matrix in the off-chip memory 515 at the locations given by the first set of four offset values of the column index array {0, 6, 9, 15} added to the first base index 0 in different sub-banks of the compressed sparse weight matrix are multiplied with the first set of four compressed sparse weight matrix values of {0.5, 0.7, 0.1, 0.2}. The element values of the dense activation matrix in the off-chip memory 515 at the locations given by the second set of four offset values of the column index array {4, 13, 14, 19} added to the second base index 0 of the compressed sparse weight matrix are multiplied with the second set of four compressed sparse weight matrix values of {0.1, 0.8, 0.3, 0.5}.

In the vertical format, the element values of the dense activation matrix in the off-chip memory 515 at the locations given by the first set of four offset values of the column index array {0, 9, 2, 7} added to the first base index 0 in different sub-banks and rows of the compressed sparse weight matrix are multiplied with the first set of four compressed sparse weight matrix values of {0.5, 0.7, 0.1, 0.2}. The element values of the dense activation matrix in the off-chip memory 515 at the locations given by the second set of four offset values of the column index array {2, 4, 3, 9} are added to the second base index 0 in different sub-banks and rows of the compressed sparse weight matrix are multiplied with the second set of four compressed sparse weight matrix values of {0.1, 0.8, 0.3, 0.5}.

In the hybrid horizontal/vertical format, the element values of the dense activation matrix in the off-chip memory 515 at the locations given by the first set of four offset values of the column index array {0, 6, 9, 15} added to the first base index 0 in different sub-banks of the compressed sparse weight matrix are multiplied with the first set of four compressed sparse weight matrix values of {0.5, 0.7, 0.1, 0.2}. The element values of the dense activation matrix in the off-chip memory 515 at the locations given by the second set of four offset values of the column index array {4, 13, 14, 19} are added to the second base index 0 of the compressed sparse weight matrix are multiplied with the second set of four compressed sparse weight matrix values of {0.1, 0.8, 0.3, 0.5}.

At 830, the result of the sparse matrix-matrix multiplication or sparse matrix-vector multiplication can be stored. In one implementation, the result of the sparse matrix-matrix multiplication or sparse matrix-vector multiplication can be cached in the one or more caches 530 of the one or more processors 510, or store in the off-chip memory 515.

In the horizontal format implementation, the gathering and sparse matrix-matrix multiplication can be performed by one or more cores 525 of the one or more processors 510 in accordance with the code of Table 1.

TABLE 1

```
base_index = &activation[0];
for (int i = 0; i < N; i++) {
    intx16 res = 0;
    for (int idx = indptr[i]; idx < indptr[i+1]; idx++) {
        intx16 weight = value[idx];
        shortx16 ofst = offset[idx];
        intx16 activation = GATHER(base_index, ofst);
        res += activation * weight;
    }
    result[i] = REDUCTION(res);
}
```

To compute one single instruction multiple data (SIMD) result, one SIMD load of weight data from cache, one SIMD load of the weight index from cache, one gather of activation matrix data from on-chip memory and one scalar store of the result is performed. The SIMD enabled processor can achieve full utilization when the memory throughput is three time the computation throughput. In one implementation, full utilization can be achieved when the elements of the weight matrix are 16-bits, or when the index size is 8-bits.

In the vertical format implementation, the sparse matrix-matrix multiplication can be performed by one or more cores 525 of the one or more processor 510 in accordance with the code of Table 2.

TABLE 2

```
int base_index = &activation[0];
for (int i = 0; i < N / X; i++) {
    intx16 res = 0;
    for (int idx = indptr[i]; idx < indptr[i+1]; idx++) {
        intx16 weight = value[idx];
        shortx16 ofst = offset[idx];
        intx16 activation = GATHER(base_index, ofst);
        res += activation * weight;
    }
    result[i * X]= res;
}
```

The element in each entry of the value array are from different rows. Therefore, there is no need to perform a reduction at the end of each row. In addition, the number of non-zero elements in each row do not need to be multiples of X, wherein X is the number of banks. The offset is still the offset values mod K, because the offset is used to load the activation.

Figure 12:
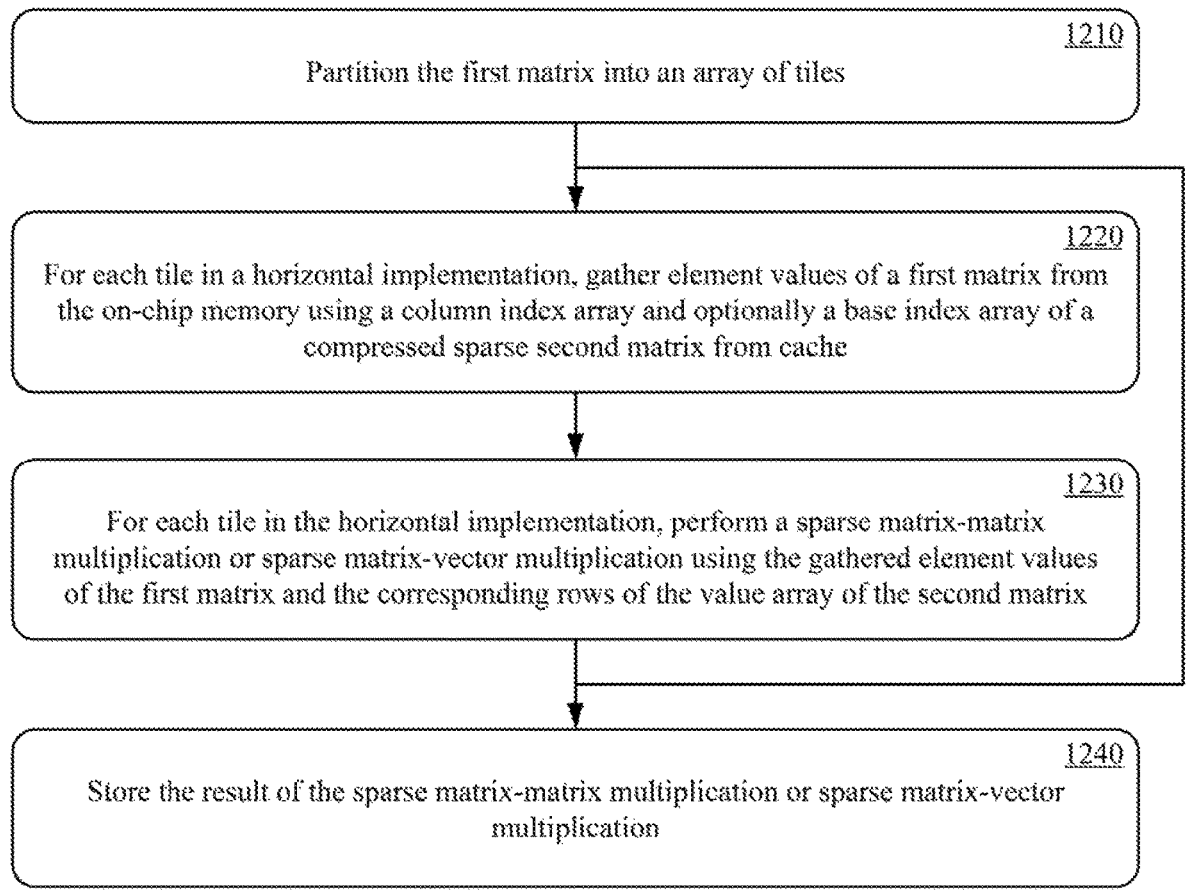
FIG. 12 shows a process of computing a sparse matrix-vector multiplication or sparse matrix-matrix multiplication, in accordance with aspects of the present technology.

In optional aspects of the present technology, sparse matrix-vector multiplication and sparse matrix-matrix multiplication on large matrices can be performed sequentially on corresponding portions (e.g. tiles) of the matrixes. Referring now to FIG. 12, a horizontal implementation of computing a sparse matrix-vector multiplication or sparse matrix-matrix multiplication, in accordance with aspects of the present technology, is shown. The process can include partitioning the first matrix into an array of tiles, at 1210. For example, a first matrix of 4096×1024 values can be partitioned into tiles of 256×256, such that that there 16×4 tiles in the matrix. At 1220, the element values of a first matrix can be gathered for each tile in the horizontal implementation from one or more on-chip memories using a column index array and optionally a base index array of a compressed sparse second matrix from one or more caches of a processor. At 1230, the sparse matrix-matrix multiplication or sparse matrix-vector multiplication can be performed for each tile in the horizontal implementation using the gathered element values of the first matrix and the corresponding rows of the value array of the second matrix. At 1240, the result of the sparse matrix-matrix multiplication or sparse matrix-vector multiplication can be stored.

Figure 13:
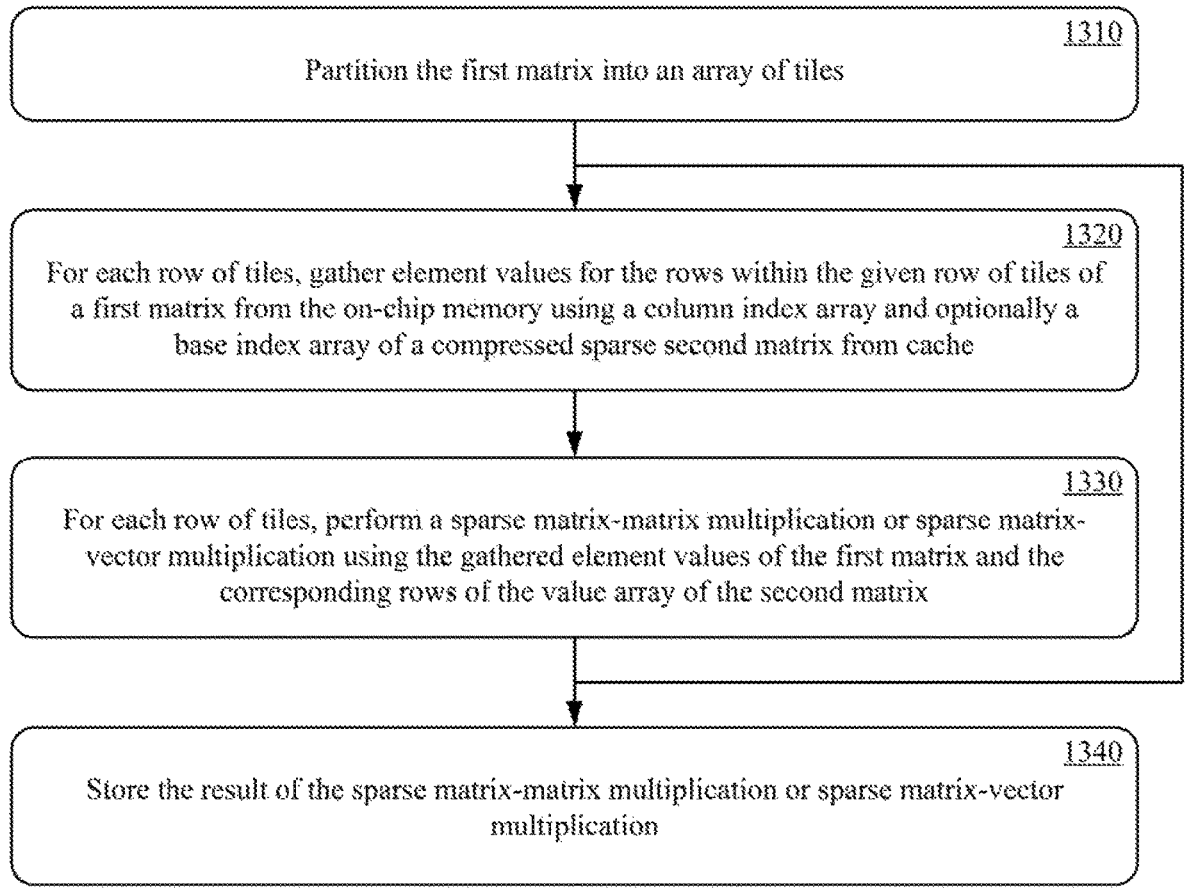
FIG. 13 shows a process of computing a sparse matrix-vector multiplication or sparse matrix-matrix multiplication, in accordance with aspects of the present technology.

Referring now to FIG. 13, vertical implementation of computing a sparse matrix-vector multiplication or sparse matrix-matrix multiplication, in accordance with aspects of the present technology, is shown. The process can include partitioning the first matrix into an array of tiles, at 1310. At 1320, the element values of a first matrix can be gathered for each tile in the horizontal implementation from one or more on-chip memories using a column index array and optionally a base index array of a compressed sparse second matrix from one or more caches of a processor. For each tile, rows of values from within the row of the given tiles can be processed in any order. Furthermore, the rows of tiles can also be processed in any order. The row of values within the rows of the given tiles do not need to be processed consecutively. For example, if there are 16 rows within the given row of tiles, and there are 16 rows of tiles, the rows within each set of sixteen rows can be processed in any order, and the sixteen sets of rows can also be processed in any order. In one implementation, the order of processing the rows can be determined by sorting the number of values in each row that are greater than a threshold. Any rows with a number of values less than the threshold can be pruned to zero. For the rows with similar number of values greater than the threshold can be processed accordingly. At 1330, the sparse matrix-matrix multiplication or sparse matrix-vector multiplication can be performed for each tile in the horizontal implementation using the gathered element values of the first matrix and the corresponding row of the value array of the second matrix. At 1340, the result of the sparse matrix-matrix multiplication or sparse matrix-vector multiplication can be stored.

Figure 14:
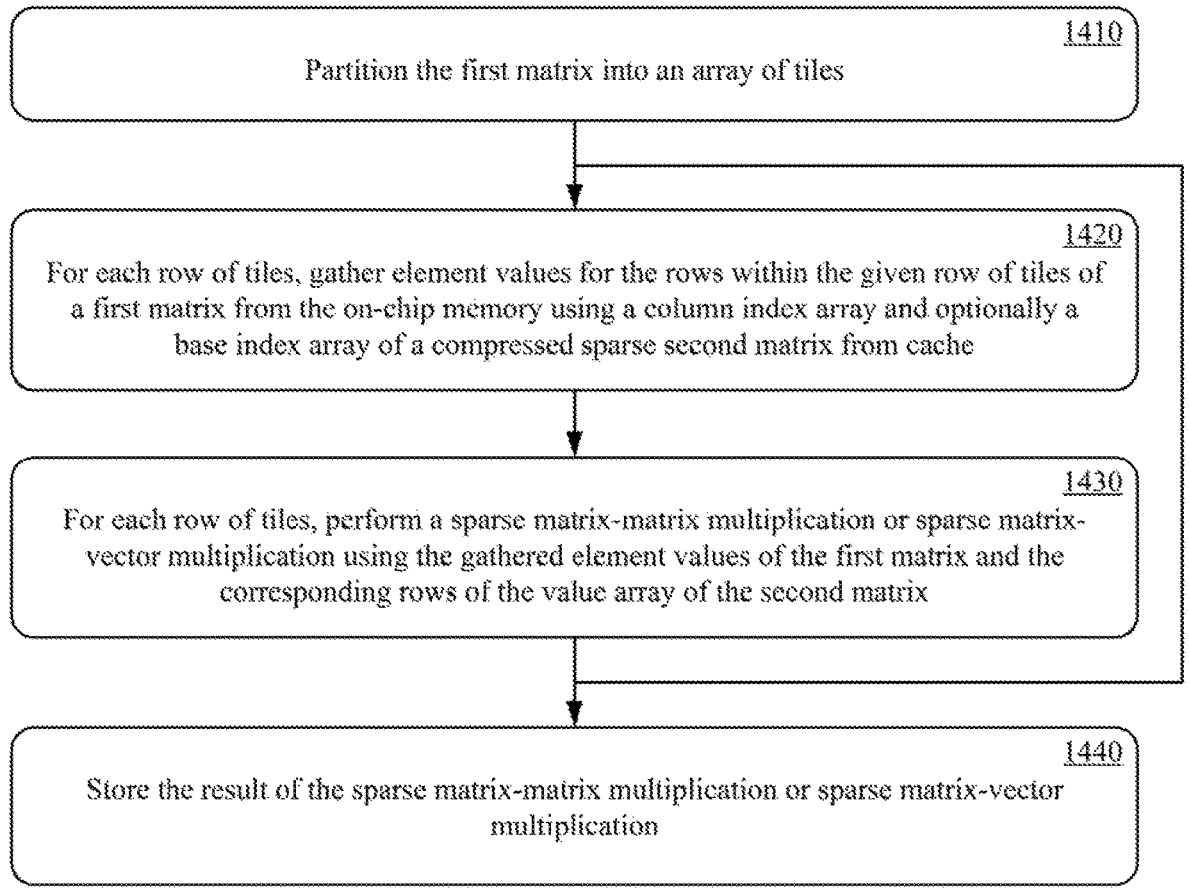
FIG. 14 shows a process of computing a sparse matrix-vector multiplication or sparse matrix-matrix multiplication, in accordance with aspects of the present technology.

Referring now to FIG. 14, hybrid implementation of computing a sparse matrix-vector multiplication or sparse matrix-matrix multiplication, in accordance with aspects of the present technology, is shown. The process can include partitioning the first matrix into an array of tiles, at 1410. At 1420, the element values of a first matrix can be gathered for each tile in the hybrid implementation from one or more on-chip memories using a column index array and optionally a base index array of a compressed sparse second matrix from one or more caches of a processor. For each tile, rows of values from within the row of the given tiles can be processed in accordance with the above described hybrid method. The rows within a row of the given tiles can be processed in any order. The row of values within the rows of the given tiles do not need to be processed consecutively. For example, if there are 4 rows within the given row of tiles, the rows within each set of four rows can be processed in any order. In one implementation, the order of processing the rows can be determined by sorting the number of values in each row that are greater than a threshold. Any rows with a number of values less than the threshold can be pruned to zero. For the rows with similar number of values greater than the threshold can be processed accordingly. At 1430, the sparse matrix-matrix multiplication or sparse matrix-vector multiplication can be performed for each tile in the hybrid implementation using the gathered element values of the first matrix and the corresponding row of the value array of the second matrix. At 1440, the result of the sparse matrix-matrix multiplication or sparse matrix-vector multiplication can be stored.

Although embodiments of the present technology are explained herein with reference to compressed sparse row (CSR) data structures, they can also be readily adapted to compressed sparse column (CSC) data structures. Aspects of the present technology advantageously reduce the memory utilization for storing sparse matrix, and or reduce computational workload to compute sparse matrix-matrix multiplications and sparse matrix-vector multiplications. The reduced memory utilization and or computation workload can also reduce power consumption in computing devices. Aspects of the present technology can advantageously substantially achieve the accuracy or quality associated of irregular sparse pruning models and the runtime performance of structured sparse pruning models. For example, the accuracy of neural architecture search for MobileNetV2 0.35 is approximately 59.64% for dense matrix-bottleneck scenarios, 68.72% for dense matrix-no bottleneck, 64.44% for sparse matrix no bottleneck-irregular pruning, 64.66% for sparse matrix-no bottleneck-16 bucket horizontal format in accordance with aspects of the present technology, and 62.83% for sparse matrix-no bottleneck-16 bucket vertical format in accordance with aspects of the present technology.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing device implemented sparse matrix calculation method, comprising:
   gathering element values of a first matrix, from an on-chip memory, using a column index array of a compressed sparse second matrix, from a cache, wherein the column index array is configured for gathering sets of element values from different sub-banks of a bank of a plurality of banks of the on-chip memory within a same row,
   wherein the compressed sparse second matrix is generated from a sparse second matrix, and
   wherein the sparse second matrix is generated by pruning a dense second matrix, so that at least a number of non-zero values in each row of the dense second matrix is a multiple of a given number of sub-banks of a bank of the plurality of banks of the on-chip memory; and
   performing a sparse matrix-matrix multiplication or sparse-matrix-vector multiplication using the gathered elements of the first matrix and a value array of the compressed sparse second matrix.

2. The computing device implemented sparse matrix calculation method of claim 1, wherein a data structure of the compressed sparse second matrix includes:
   the value array including non-zero element values of the sparse second matrix, wherein each entry includes a given number of element values;
   the column index array, wherein each entry includes a given number of offsets matching the value array; and
   an index pointer array including an index of a first element of each row of the sparse second matrix corresponding to the compressed sparse second matrix.

3. The computing device implemented sparse matrix calculation method of claim 2, wherein the data structure of the compressed sparse second matrix further includes:
   a base index array including base addresses of element values of the first matrix.

4. The computing device implemented sparse matrix calculation method of claim 1, wherein:
   the first matrix comprises an activation matrix,
   the compressed sparse second matrix comprises a compressed sparse weight matrix,
   the activation matrix is stored in the on-chip memory of a processor,
   the compressed sparse weight matrix is stored in the cache of the processor, and
   the number of non-zero values in each row is sorted based on a threshold.

5. The computing device implemented sparse matrix calculation method of claim 4, further comprising:

pruning the rows having the number of non-zero values less than the threshold.

6. The computing device implemented sparse matrix calculation method of claim 4, further comprising:
pruning the dense second matrix, so that a number of non-zero values in each sub-bank of a bank of the plurality of banks of the on-chip memory is the same, to generate the sparse second matrix.

7. The computing device implemented sparse matrix calculation method of claim 6, further comprising:
partitioning the first matrix into an array of tiles;
gathering element values of the first matrix, for each tile, using the column index array of the compressed sparse second matrix, wherein the column index array is further configured for gathering element values from different sub-banks within the same row; and
performing the sparse matrix-matrix multiplication or sparse-matrix-vector multiplication for each tile using the gathered element values of the first matrix and the corresponding rows of the value array of the compressed sparse second matrix.

8. The computing device implemented sparse matrix calculation method of claim 4, further comprising:
pruning the dense second matrix, wherein a number of non-zero elements in each row do not need to be equal to the number of sub-banks of a bank of the plurality of banks of the on-chip memory, to generate the sparse second matrix.

9. The computing device implemented sparse matrix calculation method of claim 8, further comprising:
partitioning the first matrix into an array of tiles;
gathering element values of the first matrix, for each row of tiles, using the column index array of the compressed sparse second matrix, wherein the column index array is further configured for gathering the element values from different rows; and
performing the sparse matrix-matrix multiplication or sparse-matrix-vector multiplication for each row of tiles using the gathered element values of the rows within each given row of tiles of the first matrix and the corresponding rows of the value array of the compressed sparse second matrix.

10. The computing device implemented sparse matrix calculation method of claim 8, further comprising:
partitioning the first matrix into an array of tiles;
gathering element values of the first matrix, for each row of tiles, using the column index array of the compressed sparse second matrix, wherein the column index array is further configured for gathering element values from a set of rows and from different sub-banks within the same row; and
performing the sparse matrix-matrix multiplication or sparse-matrix-vector multiplication for each row of the tiles using the gathered element values of the rows within each given row of the tiles of the first matrix and the corresponding rows of the value array of the compressed sparse second matrix.

11. A processor, comprising:
one or more on-chip memories configured to store a first matrix, wherein each on-chip memory, of the one or more on-chip memories, includes a plurality of banks, and wherein each bank of the plurality of banks includes a plurality of sub-banks;
one or more caches or one or more memories configured to store a compressed sparse second matrix data structure including:
a value array including non-zero element values of the sparse second matrix, wherein each entry includes a given number of element values; and
a column index array, wherein each entry includes a given number of offsets matching the value array; and
one or more gather/scatter engines configured to gather element values of the first matrix, using the column index array of the sparse second matrix, wherein the compressed sparse second matrix is generated from the sparse second matrix, and wherein the sparse second matrix is generated by pruning a dense second matrix, so that at least a number of non-zero values in each row of the dense second matrix is a multiple of a given number of sub-banks of a bank of the plurality of banks of the one or more on-chip memories.

12. The processor according to claim 11, wherein the one or more gather/scatter engines are further configured to gather sets of element values from different sub-banks of a bank of the plurality of banks of the one or more on-chip memories within a same row for a given offset of the column index array.

13. The processor according to claim 11, wherein the one or more gather/scatter engines are further configured to gather sets of element values from different rows for a given offset of the column index array.

14. The processor according to claim 11, wherein the one or more gather/scatter engines are further configured to gather sets of element values from a set of rows and from different sub-banks within the same row.

15. The processor according to claim 11, wherein the data structure of the compressed sparse second matrix further includes:
an index pointer array including an index of a first element of each row of the sparse second matrix; and
a base index array including base addresses of element values.

16. The processor according to claim 11, wherein the number of non-zero values in each row is sorted based on a threshold, and wherein the rows having the number of non-zero values less than the threshold are pruned.

17. The processor according to claim 11, further comprising one or more cores configured to perform sparse matrix-matrix multiplication or sparse-matrix-vector multiplication using the gathered element values of the first matrix and the value array of the compressed sparse second matrix.

18. A processor, comprising:
an on-chip memory including a plurality of banks, wherein each bank, of the plurality of banks, includes a plurality of sub-banks; and
a core configured to:
prune a dense matrix to generate a sparse matrix, so that at least a number of non-zero values in each row of the dense matrix is a multiple of a given number of sub-banks of a bank of the plurality of banks of the on-chip memory; and
generate a compressed sparse matrix from the sparse matrix having a data structure including:
a value array including non-zero element values of the sparse second matrix, where each entry includes a given number of element values;
a column index array, where each entry includes a given number of offsets of corresponding sets of non-zero element values the value array; and
an index pointer array including an index of a first element of each row of the sparse matrix.

19. The processor according to claim 18, further comprising:
- the on-chip memory configured to store a matrix or vector;
- a gather/scatter engine configured to gather element values of the matrix or vector using the column index array of the sparse matrix; and
- the core further configured to perform sparse matrix-matrix multiplication or sparse-matrix-vector multiplication using the gathered element values of the matrix or vector and the value array of the compressed sparse matrix.

20. The processor according to claim 19, wherein the gather/scatter engine is further configured to horizontally and vertically gather sets of element values from sets of rows and from different sub-banks within the same row based on the column index array of the compressed sparse matrix.

* * * * *